United States Patent
Ikeda et al.

(10) Patent No.: US 7,967,123 B2
(45) Date of Patent: Jun. 28, 2011

(54) WET-TYPE MULTI-PLATE FRICTION ENGAGING APPARATUS

(75) Inventors: Yosuke Ikeda, Fukuroi (JP); Tomoyuki Miyazaki, Fukuroi (JP)

(73) Assignee: NSK-Warner K.K, Tokyo (JP)

( * ) Notice: Subject to any disclaimer, the term of this patent is extended or adjusted under 35 U.S.C. 154(b) by 573 days.

(21) Appl. No.: 12/037,995

(22) Filed: Feb. 27, 2008

(65) Prior Publication Data
US 2008/0217133 A1 Sep. 11, 2008

(30) Foreign Application Priority Data

Mar. 5, 2007 (JP) ................... 2007-054120

(51) Int. Cl.
*F16D 25/0638* (2006.01)
*F16D 13/52* (2006.01)
(52) U.S. Cl. ............... 192/85.34; 192/70.14; 192/85.43; 192/85.46; 192/109 R; 192/109 B
(58) Field of Classification Search ............... 192/85.45, 192/85.46, 70.14, 85.24, 85.34, 85.43, 109 R, 192/109 B
See application file for complete search history.

(56) References Cited

U.S. PATENT DOCUMENTS

| | | | | |
|---|---|---|---|---|
| 3,353,641 A | * | 11/1967 | Chana | 192/85.34 |
| 5,454,457 A | * | 10/1995 | Sakai et al. | 192/35 |
| 5,794,751 A | * | 8/1998 | Kerendian | 192/85.46 |
| 2003/0015392 A1 | * | 1/2003 | Shoji et al. | 192/85 AA |
| 2008/0142331 A1 | * | 6/2008 | Miyazaki et al. | 192/70.12 |

FOREIGN PATENT DOCUMENTS

JP 2006-105397 A 4/2006

* cited by examiner

*Primary Examiner* — Richard M. Lorence
(74) *Attorney, Agent, or Firm* — Miles & Stockbridge P.C.

(57) ABSTRACT

The present invention provides a wet-type multi-plate friction engaging apparatus comprising a clutch portion including internally toothed plates and a piston adapted to apply an urging force for engaging the internally toothed plates and wherein load acting portions acting on the clutch portion are arranged on both sides of the clutch portion, and a contact area of the load acting portion through which the load acting portion is contacted with the clutch portion is located in a predetermined range between about 20% of a radial width of a friction engaging portion from a central position of the friction engaging portion in an outer diameter direction and about 20% of the radial width of the friction engaging portion in an inner diameter direction, and a radial width of the contact area is smaller than about 10% of the radial width of the friction engaging portion.

15 Claims, 6 Drawing Sheets

WET-TYPE MULTI-PLATE FRICTION ENGAGING APPARATUS

BACKGROUND OF THE INVENTION

1. Field of the Invention

The present invention relates to a wet-type multi-plate friction engaging apparatus in a clutch or a brake of an automatic transmission of a motor vehicle, a lock-up clutch, a starting clutch and the like.

2. Related Background Art

A wet-type multi-plate clutch i.e. wet-type multi-plate friction engaging apparatus comprising paper friction materials has various advantages that torque to be transmitted can be controlled on the basis of a load applied to a friction surface and that permits smooth engagement during the transmission of torque and is used mainly and widely in speed changing devices of automatic transmissions, torque converters, starting clutches or the like. One example of such starting clutches is shown in Japanese Patent Application Laid-Open No. 2006-105397.

Excellent heat resistance and smooth engagement is required for the wet-type multi-plate clutch used in the automatic transmission.

A conventional wet-type multi-plate friction engaging apparatus is constituted as shown in FIG. 12. The conventional wet-type multi-plate friction engaging apparatus 100 comprises internally toothed plates 105 each of which is obtained by sticking paper friction materials 104 onto both surfaces of a metal plate, externally toothed plates 106 formed from metal plates, the plates 105 and 106 being arranged alternately within a clutch drum 101, a piston 107 for urging the internally toothed plates 105 and the externally toothed plates 106 against each other, a backing plate 103, and a snap ring 102 for supporting the internally toothed plates 105, externally toothed plates 106 and backing plate 103.

In the above-mentioned conventional apparatus, since camber deformation of each plate and warping deformation of the clutch drum 101 are generated by the urging of the piston 107, there is a tendency that face pressure on the friction surface becomes greater at an outer diameter side than at an inner diameter side toward the opening end of the clutch drum 101. Such a tendency becomes more noticeable as rigidity of the clutch drum 101 is decreased and as a thickness of the backing plate 104 is decreased, and, in particular, the outer diameter side face pressure on the friction material 104 at the opening end of the clutch drum 101 becomes greater. As a result, since the whole surface of each friction plate 104 does not work effectively, heat resistance may be reduced and smooth movements of the plates may be prevented, thereby affecting a bad influence upon the engaging property.

Further, in recent years, as light weight, increase in stages of the automatic transmission and reduction of cost have been requested, weights of the clutch drum and the backing plate are requested to be reduced and, at the same time, burning or baking of the clutch has been increased because of rotation at high speed.

SUMMARY OF THE INVENTION

Thus, an object of the present invention is to provide a wet-type multi-plate friction engaging apparatus in which, by designing so that load acting positions on plates at a piston side and at piston-opposite side are positioned in the vicinity of centers of the plates, whole engaging faces of friction surfaces of all of the plates are contacted with each other with uniform face pressure to prevent offset of heat generating areas produced in the course of the friction engagement, whereby a heat-resisting ability of a clutch portion is enhanced.

To achieve the above object, according to the present invention, there is provided a wet-type multi-plate friction engaging apparatus comprising a clutch portion including internally toothed plates having at least one axial surface on which a friction material is provided and externally toothed plates arranged alternately with the internally toothed plates in an axial direction, and a piston adapted to apply an urging force for engaging the internally toothed plates and the externally toothed plates with each other, and wherein load acting portions acting on the clutch portion are arranged on both sides of the clutch portion, and a contact area of the load acting portion through which the load acting portion is contacted with the clutch portion is located in a predetermined range between about 20% of a radial width of a friction engaging portion from a central position of the friction engaging portion in an outer diameter direction and about 20% of the radial width of the friction engaging portion in an inner diameter direction, and a radial width of the contact area is smaller than about 10% of the radial width of the friction engaging portion.

With this arrangement, since the load is applied to the friction surfaces in the vicinity of the centers thereof during the engagement, the plates can be moved smoothly during the engagement, thereby providing the smooth engaging property. Further, since the transmitting efficiency of the clutch portion is enhanced and torque capacity is increased, the equivalent torque can be transmitted with the fewer number of friction plates, in comparison with the prior art.

Since the contact area is located in the range between about 20% of the width of a friction engaging portion (a range between an outermost diameter position and an innermost diameter position of the friction engagement) from the central position of the friction engaging portion in the outer diameter direction and about 20% of the width of the friction engaging portion in the inner diameter direction, and since the radial width of the contact area is smaller than about 10% of the radial width of the friction engaging portion, the face pressures of various plates within the clutch can be made uniform and variation in face pressure distribution between clutch plates can be reduced, thereby providing a heat-resistive wet-type multi-plate friction engaging apparatus having a stable speed changing performance.

Further, by forming the load acting portion as the curved surface, a more stable and more uniform load can be applied through the friction surface. The protruded portion may be formed by a cutting operation or a pressing operation or may be formed by mounting a separate part to the piston or the plate member. The load acting portion or the protruded portion may also have a cushioning function and/or a stop ring function. In this case, a more reliable wet-type multi-plate friction engaging apparatus can be provided.

Now, with reference to FIG. 11, some of terms used in embodiments and claims in this application will be defined. For convenience's sake, although such terms are defined on the basis of an embodiment shown in FIG. 1, it should be noted that such terms can be used in common in all of claims, embodiments and modifications. In FIG. 11, a protrusion 12 provided in a piston 7 has a rectangular cross-section and is in contact with an outer tooth plate 6 with a rectangular end surface to define a contact area.

A contact area LP of each of load acting portions acting on a clutch portion at both axial sides of the clutch portion comprising internally toothed plates and externally toothed plates is located within a predetermined range R between about 20% of a width W of a friction engaging portion from a central position CP of the friction engaging portion in an outer diameter direction and about 20% of the width W of the friction engaging portion in an inner diameter direction, and a width of the contact area LP is selected to be smaller than about 10% of the width W of the friction engaging portion.

The "friction engaging portion" means a range an outermost diameter position of friction engagement and an innermost diameter position of the friction engagement, and the "width of friction engaging portion" is substantially equal to a radial width of the friction material. The "predetermined range" means a range between 20% of the width of the friction engaging portion from the central position CP of the friction engaging portion in the inner and outer diameter directions, respectively.

Further features of the present invention will become apparent from the following description of exemplary embodiments with reference to the attached drawings.

DETAILED DESCRIPTION OF THE INVENTION

Now, embodiments of the present invention will be explained with reference to the accompanying drawings.

Incidentally, various embodiments which will be described below are merely examples and do not limit the present invention in all senses.

Figure 1:
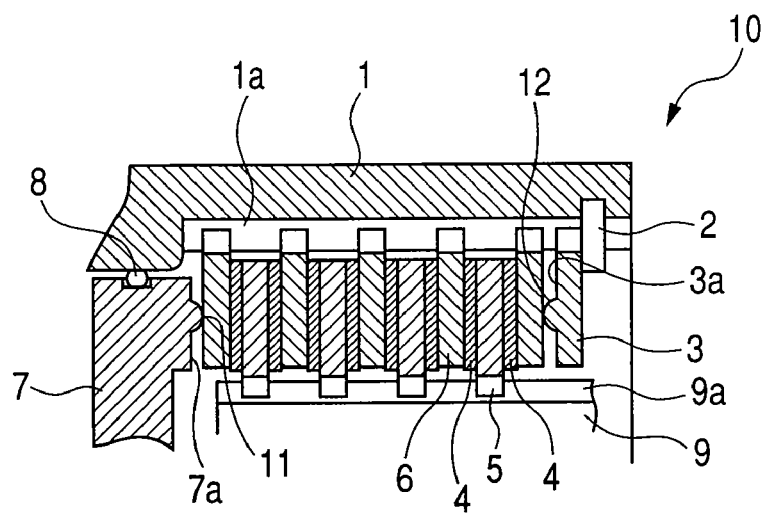
FIG. 1 is an axial partial sectional view of a wet-type multi-plate friction engaging apparatus according to a first embodiment of the present invention.

FIGS. 1 to 5 are axial partial sectional views showing wet-type multi-plate friction engaging apparatuses according to first to fifth embodiments of the present invention, respectively. FIG. 1 shows a first embodiment in which a wet-type multi-plate friction engaging apparatus 10 comprises a substantially cylindrical clutch drum 1 opened at its axial one end (right end in FIG. 1), a hub 9 disposed within the clutch drum 1 and rotatable coaxially with and relative to the clutch drum, annular externally toothed plates 6 mounted in splines 1a formed in an inner peripheral surface of the clutch drum 1 for shifting movement in an axial direction, and annular internally toothed plates 5 mounted in splines 9a formed in an outer peripheral surface of the hub 9 and disposed alternately with the externally toothed plates 6 in the axial direction and each having both axial surfaces to which friction materials 4 are adhered. There are plural externally toothed plates 6 and plural internally toothed plates 5.

The wet-type multi-plate clutch 10 includes a piston 7 for urging the externally toothed plates 6 and the internally toothed plates 5 which constitute a clutch portion to engage these plates with each other, and a plate member or backing plate 3 provided on the inner peripheral surface of the clutch drum 1 to hold the externally toothed plates 6 and the internally toothed plates 5 at one end in the axial direction and a stop ring 2 for holding the backing plate.

As shown in FIG. 1, the piston 7 is mounted within a closed end portion of the clutch drum 1 for axial sliding movement. An O-ring 8 is disposed between an outer peripheral surface of the piston 7 and the inner peripheral surface of the clutch drum 1. Further, a sealing member (not shown) is disposed between an inner peripheral surface of the piston 7 and an outer peripheral surface of a cylindrical portion (not shown) of the clutch drum 1. Accordingly, an oil-tight hydraulic chamber (not shown) is defined between an inner surface of the closed end portion of the clutch drum 1 and the piston 7. Further, the hub 9 is provided with a lubricating oil supply port (not shown) passing through the hub so that the lubricating oil is supplied from inner diameter side to an outer diameter side of the wet-type multi-plate clutch 10.

In the wet-type multi-plate clutch 10 so constructed, engagement and disengagement of the clutch are achieved in the following manner. A condition shown in FIG. 1 is a clutch engaging condition in which the externally toothed plates 6 and the internally toothed plates 5 are contacted with each other. Incidentally, in a clutch disengaging condition, the piston 7 is displaced toward the closed end of the clutch drum 1 by a biasing force of a return spring (not shown).

In order to achieve the engagement of the clutch from the disengaging condition, hydraulic pressure is supplied to the hydraulic chamber (not shown) defined between the piston 7 and the clutch drum 1. As the hydraulic pressure is increased, the piston 7 is shifted to the right in FIG. 1 in the axial direction in opposition to the biasing force of the return spring (not shown), thereby closely contacting the externally toothed plates 6 and the internally toothed plates 5 with each other. In this way, the clutch is engaged.

After the engagement, in order to release or disengage the clutch again, the hydraulic pressure is released from the hydraulic chamber. When the hydraulic pressure is released, by the biasing force of the return spring (not shown), the piston 7 is displaced toward the closed end of the clutch drum 1, thereby disengaging the clutch.

FIG. 1 is an axial partial sectional view of the wet-type multi-plate friction engaging apparatus according to the first embodiment of the present invention. In the first embodiment shown in FIG. 1, load acting portions are provided on the piston 7 and the backing plate 3. A protrusion 11 as the load acting portion is formed on an urging surface 7a of the piston 7 which confronts the clutch portion. The protrusion 11 is formed as a semi-spherical configuration extending in the axial direction. Accordingly, when the piston 7 applies an urging force to the clutch portion, a curved surface of the protrusion 11 abuts against a metallic surface of the externally toothed plate 6.

Further, a protrusion 12 as the load acting portion is formed on a surface 3a (which confronts the clutch portion) of the backing plate 3 arranged at a position opposed to the piston 7 with the inter position of the clutch portion in the axial direction. The protrusion 12 is formed as a semi-spherical configuration extending in the axial direction. Accordingly, when the piston 7 applies the urging force to the clutch portion, a metallic surface of the externally toothed plate 6 abuts against a curved surface of the protrusion provided on the stationary backing plate 3. The protrusion 11 is formed integrally with the piston 7 and the protrusion 12 is formed integrally with the backing plate 3.

Figure 11:
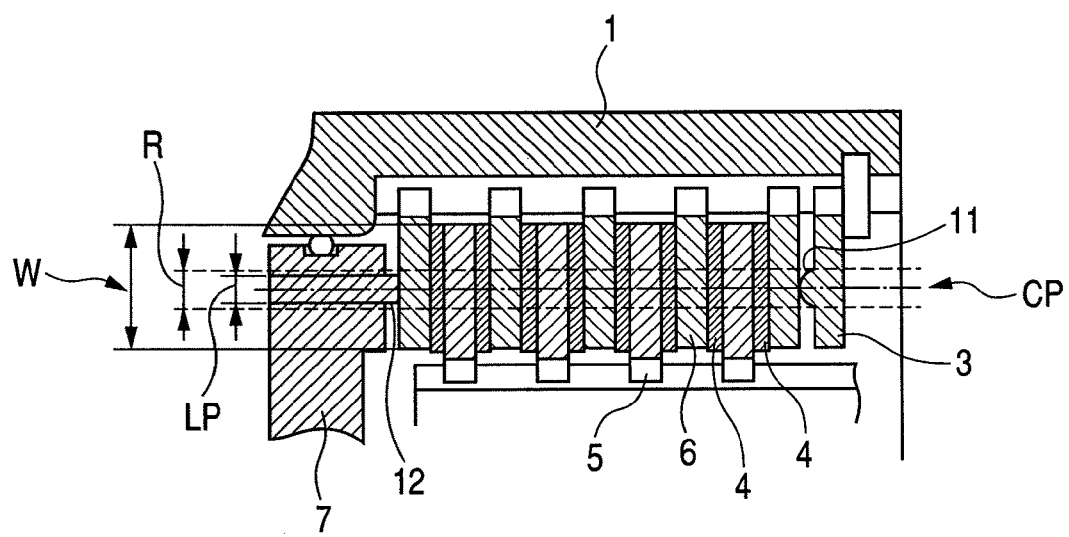
FIG. 11 is an axial partial sectional view of a wet-type multi-plate friction engaging apparatus, for explaining terms used in this specification.
Figure 12:
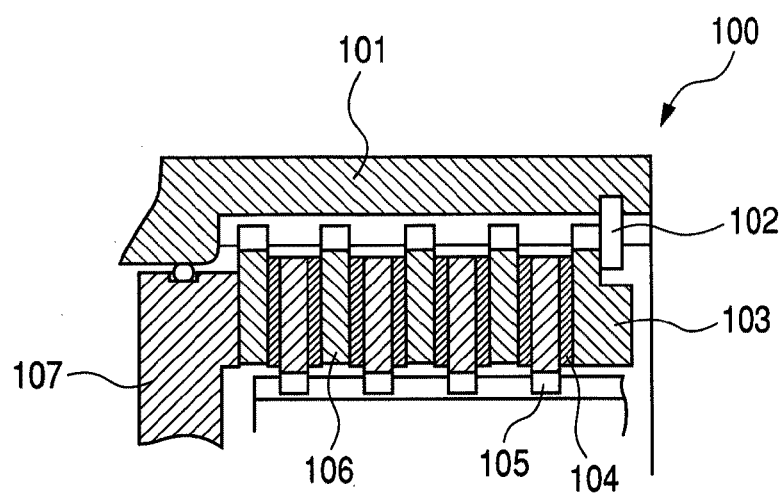
FIG. 12 an axial partial sectional view of a conventional wet-type multi-plate friction engaging apparatus.

In order to satisfy the relationships described with reference to FIG. 11, the protrusions 11 and 12 are formed so that they are positioned on a substantially the same single straight line parallel with a central axis of the clutch portion. Accordingly, upon engagement, since the load acts on the central portions of the friction surfaces, the plates are smoothly moved during the engagement, thereby providing a smooth engaging property. Further, since a transmitting efficiency of the clutch portion is enhanced to increase a torque capacity, torque same as that in the prior art can be transmitted with the fewer number of friction plates.

Figure 2:
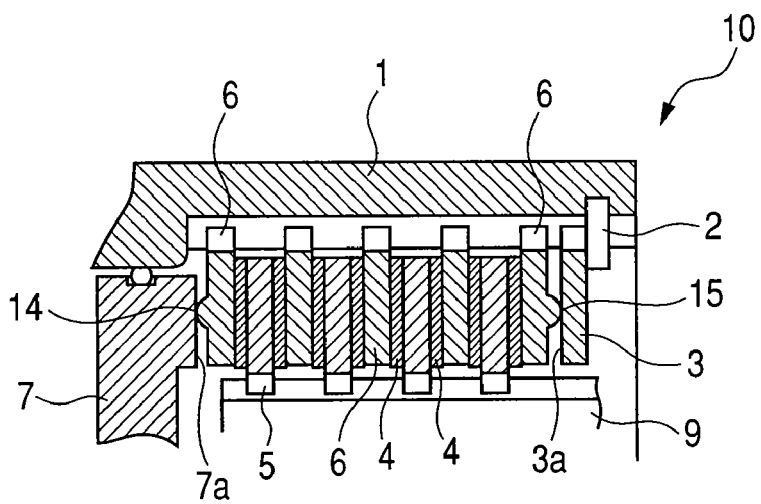
FIG. 2 is an axial partial sectional view of a wet-type multi-plate friction engaging apparatus according to a second embodiment of the present invention.

FIG. 2 is an axial partial sectional view of a wet-type multi-plate friction engaging apparatus according to a second embodiment of the present invention. In FIG. 2, members on which the load acting portions are provided differ from the members in the first embodiment. The load acting portions are provided on both outermost externally toothed plates 6 in the axial direction of the clutch portion. A protrusion 14 is formed on a surface (opposed to the urging surface 7a of the piston 7) of the externally toothed plate 6 adjacent to the piston 7. The protrusion 14 is formed as a semi-spherical configuration extending in the axial direction. Accordingly, when the piston 7 applies the urging force to the clutch portion, a curved surface of the protrusion 14 abuts against the urging surface 7a of the piston 7.

On the other hand, a protrusion 15 is formed on a surface (opposed to the backing plate 3) of the externally toothed plate 6 adjacent to the backing plate 3. The protrusion 15 is formed as a semi-spherical configuration extending in the axial direction. Accordingly, when the piston 7 applies the urging force to the clutch portion, a curved surface of the protrusion 15 abuts against the surface 3a of the backing plate 3. Also in this embodiment, so as to satisfy the relationships described with reference to FIG. 11, the protrusions 14 and 15 are formed so that they are positioned on a substantially the same single straight line parallel with the central axis of the clutch portion. The protrusion is formed integrally with externally toothed plate adjacent to the backing plate and the protrusion 14 is formed integrally with the externally toothed plate adjacent to the piston 7.

Figure 3:
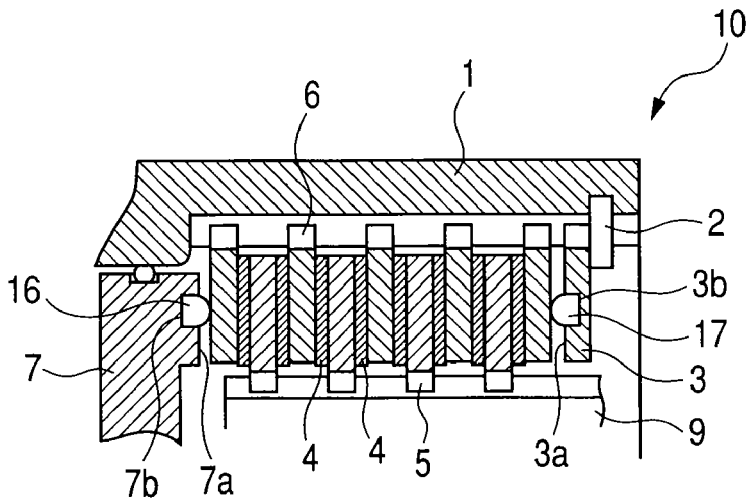
FIG. 3 is an axial partial sectional view of a wet-type multi-plate friction engaging apparatus according to a third embodiment of the present invention.

FIG. 3 is an axial partial sectional view of a wet-type multi-plate friction engaging apparatus according to a third embodiment of the present invention. In the third embodiment, protrusions as the load acting portions are provided separately. A protrusion member 16 is fixedly fitted into a recessed portion 7b formed in the urging surface 7a of the piston 7. Further, the backing plate 3 is provided with a recessed portion 3b similarly and a protrusion member 17 is fixedly fitted into the recessed portion 3b.

Both of the protrusion members 16 and 17 are formed as semi-spherical configurations having distal ends extending in the axial direction.

Also in the third embodiment, so as to satisfy the relationships described with reference to FIG. 11, the protrusions 14 and 15 are formed so that they are positioned on a substantially the same single straight line parallel with the central axis of the clutch portion. When the piston 7 exerts the urging force to engage the clutch, a curved surface of the distal end of the protrusion member 16 abuts against the metallic surface of the externally toothed plate 6 and a curved surface of the distal end of the protrusion member 17 also abuts against the metallic surface of the externally toothed plate 6.

Figure 4:
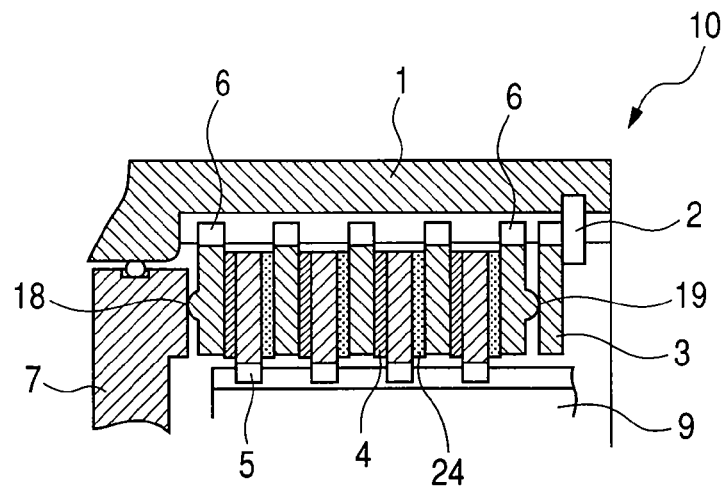
FIG. 4 is an axial partial sectional view of a wet-type multi-plate friction engaging apparatus according to a fourth embodiment of the present invention.

FIG. 4 is an axial partial sectional view of a wet-type multi-plate friction engaging apparatus according to a fourth embodiment of the present invention. In this embodiment, although the construction of the load acting portions is substantially the same as that of the second embodiment, a construction of friction materials differs from that of the second embodiment. In this embodiment, each friction material is provided on one surface of each of the internally toothed plates 5 and the externally toothed plates 6. The friction material 24 is adhered to a left surface (FIG. 4) of each externally toothed plate 6 and the friction material 4 is adhered to a left surface of each internally toothed plate 5. Accordingly, when such internally toothed plates 5 and externally toothed plates 6 are alternately arranged along the axial direction, as shown in FIG. 4, except both end plates, the friction materials are located on both surfaces of each plate.

The protrusions as the load acting portions have substantially the same construction as that in the second embodiment, in which a protrusion 18 is formed integrally with the surface (opposed to the urging surface 7a of the piston 7) of the externally toothed plate 6 adjacent to the piston 7. The protrusion 18 is formed as a semi-spherical configuration extending in the axial direction. Accordingly, when the piston 7 applies the urging force to the clutch portion, a curved surface of the protrusion 18 abuts against the urging surface 7a of the piston 7.

On the other hand, a protrusion 19 is formed integrally with a surface (opposed to the backing plate 3) of the externally toothed plate 6 adjacent to the backing plate 3. The protrusion 19 is formed as a semi-spherical configuration extending in the axial direction. Accordingly, when the piston 7 applies the urging force to the clutch portion, a curved surface of the protrusion 19 abuts against the surface 3a of the backing plate 3. Also in this embodiment, so as to satisfy the relationships described with reference to FIG. 11, the protrusions 18 and 19 are formed so that they are positioned on a substantially the same single straight line parallel with the central axis of the clutch portion.

Figure 5:
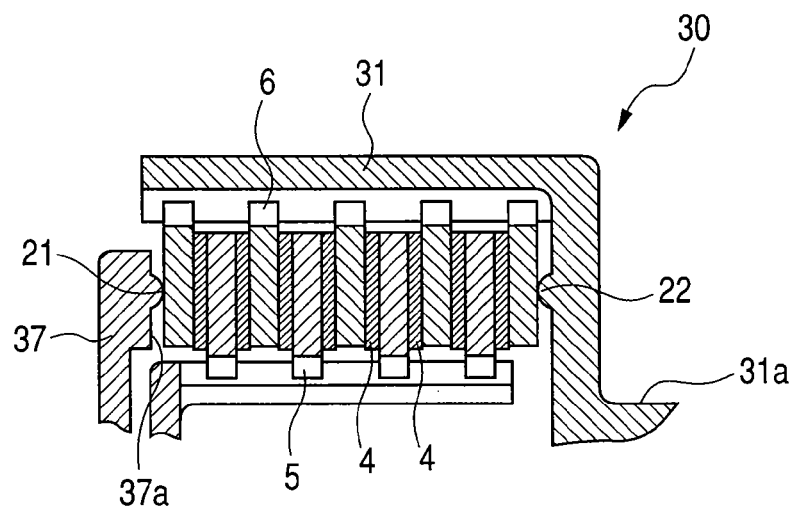
FIG. 5 is an axial partial sectional view of a wet-type multi-plate friction engaging apparatus according to a fifth embodiment of the present invention.

FIG. 5 is an axial partial sectional view of a wet-type multi-plate friction engaging apparatus according to a fifth embodiment of the present invention. In this embodiment, a construction of load acting portions differs from those in the first to fourth embodiments. A protrusion 22 as a load acting portion is formed integrally with an inner surface 31a of a closed end of a clutch drum 31 and is opposed to the externally toothed plate 6. The protrusion 22 is formed as a semi-spherical configuration extending in the axial direction.

On the other hand, a protrusion 21 is formed integrally with an urging surface 37a (opposed to the externally toothed plate 6) of a piston 37 disposed within the closed end portion of the clutch drum 31. The protrusion 21 is formed as a semi-spherical configuration extending in the axial direction.

The other constructions are similar to these in the first to third embodiments. So as to satisfy the relationships described with reference to FIG. 11, the protrusions 21 and 22 are formed so that they are positioned on a substantially the same single straight line parallel with the central axis of the clutch portion.

Figure 6:
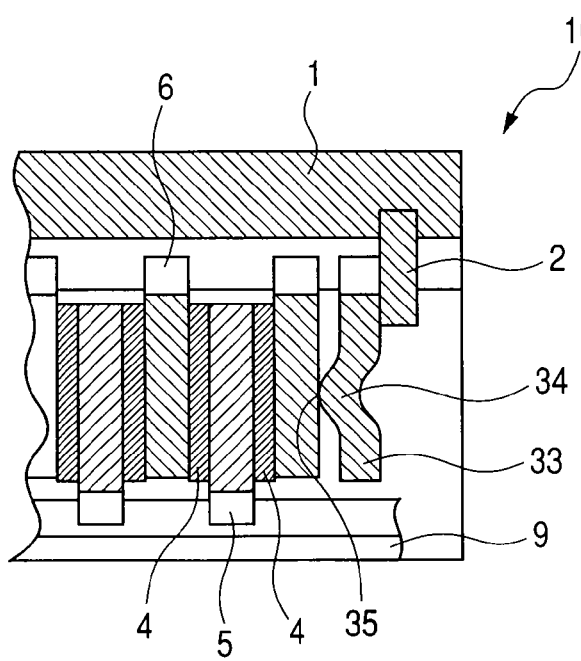
FIG. 6 is an axial partial sectional view of a wet-type multi-plate friction engaging apparatus, showing an alteration of a plate member.

FIG. 6 is an axial partial sectional view of a wet-type multi-plate friction engaging apparatus, showing an alteration of a plate member. A plate member or backing plate 33 arranged at an opposite side from the piston 7 with the interposition of the clutch portion is provided at its radial middle part with a curved (curvilinear) bent portion 34 protruding toward the externally toothed plate 6. An apex 35 is formed on the curved bent portion 34 to direct toward the externally toothed plate 6. The apex has a function corresponding to the protrusions in the above-mentioned various embodiments. When the piston (not shown in FIG. 6) applies the urging force to the clutch portion, the right surface of the rightmost externally toothed plate 6 urged by the piston abuts against a curved surface of the apex 35. Incidentally, a protrusion provided on or near the piston 7 (piston side protrusion) may be the same as those in the previous embodiments. The apex 35 and the piston side protrusion are formed so that they are positioned on a substantially the same single straight line parallel with the central axis of the clutch portion.

Figure 7:
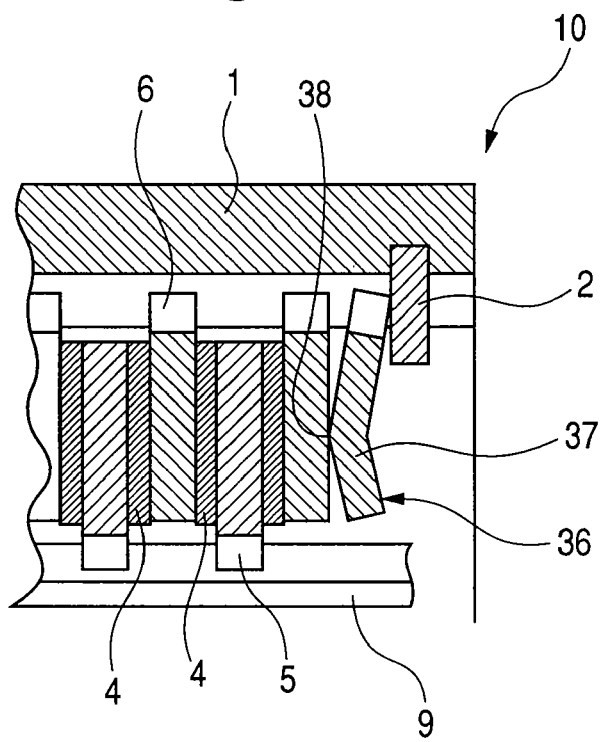
FIG. 7 is an axial partial sectional view of a wet-type multi-plate friction engaging apparatus, showing another alteration of a plate member.

FIG. 7 is an axial partial sectional view of a wet-type multi-plate friction engaging apparatus, showing another alteration of a plate member. A plate member or backing plate 36 arranged at an opposite side from the piston 7 with the interposition of the clutch portion is provided at its radial middle part with a straightly bent portion 37 protruding toward the externally toothed plate 6. An apex 38 is formed on the straightly bent portion 37 to direct toward the externally toothed plate 6. The apex has a function corresponding to the protrusions in the above-mentioned various embodiments. When the piston (not shown in FIG. 7) applies the urging force to the clutch portion, the right surface of the rightmost externally toothed plate 6 urged by the piston abuts against an ridge line of the apex 38. Incidentally, a protrusion provided on or near the piston 7 (piston side protrusion) may be the same as those in the previous embodiments. The apex 38 and the piston side protrusion are formed so that they are positioned on a substantially the same single straight line parallel with the central axis of the clutch portion.

Figure 8:
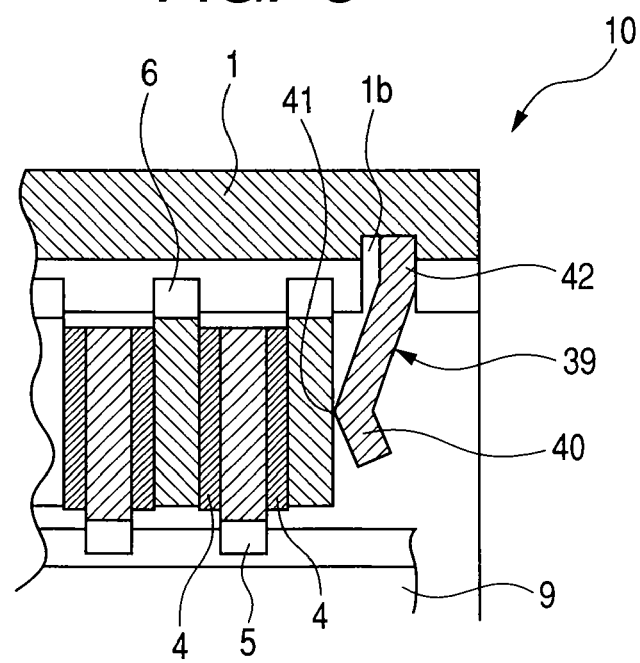
FIG. 8 is an axial partial sectional view of a wet-type multi-plate friction engaging apparatus, showing a further alteration of a plate member.

FIG. 8 is an axial partial sectional view of a wet-type multi-plate friction engaging apparatus, showing a further alteration of a plate member. A plate member or backing plate 39 arranged at an opposite side from the piston 7 with the interposition of the clutch portion is provided at its radial middle part with a bent portion 40. An apex 41 is formed on the bent portion 40 to direct toward the externally toothed plate 6. The apex 41 of the bent portion 40 has a function corresponding to the protrusions in the above-mentioned various embodiments. When the piston (not shown in FIG. 8) applies the urging force to the clutch portion, the right surface of the rightmost externally toothed plate 6 urged by the piston abuts against the apex 41. The apex 41 and a piston side protrusion are formed so that they are positioned on a substantially the same single straight line parallel with the central axis of the clutch portion.

In FIG. 8, since the backing plate 39 also acts as the stop ring 2, the stop ring 2 is omitted. A radially outward end 42 of the backing plate 39 is fitted into an annular groove 1*b* formed in the inner peripheral surface of the clutch drum 1. Accordingly, due to the engagement between the apex 41 of the backing plate 39 and the externally toothed plate 6, the clutch portion can be prevented from being dislodged along the axial direction and the urging force can be applied to the clutch portion between the piston 7 and the backing plate.

Figure 9:
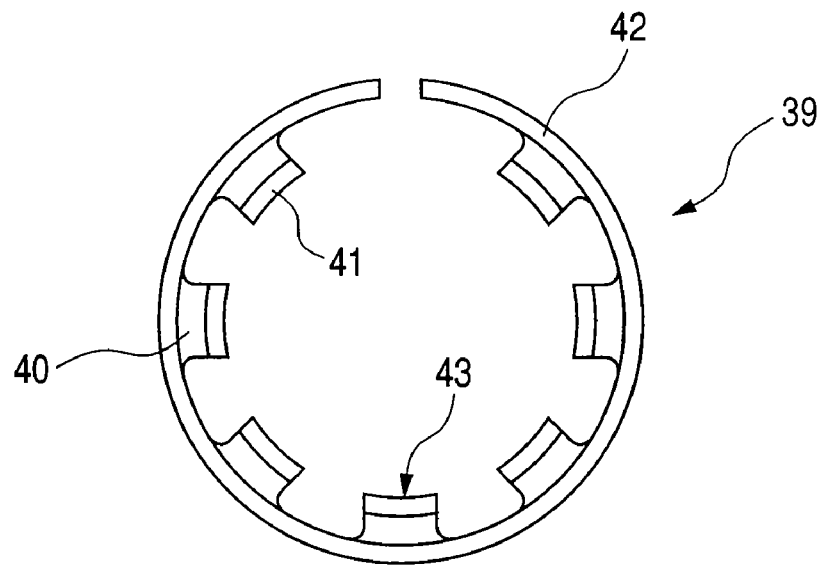
FIG. 9 is a front view of the plate member of FIG. 8.

FIG. 9 is a front view of the backing plate 39 of FIG. 8. The backing plate 39 having a C-shaped configuration has C-shaped annular ends 42 obtained by partially cutting along a circumferential direction. From the annular ends 42, along an inner peripheral surface of the backing plate, there are provided a plurality of protruded portions 43 having the bent portions 40. The protruded portions 43 are distributed substantially equidistantly along the circumferential direction.

Figure 10:
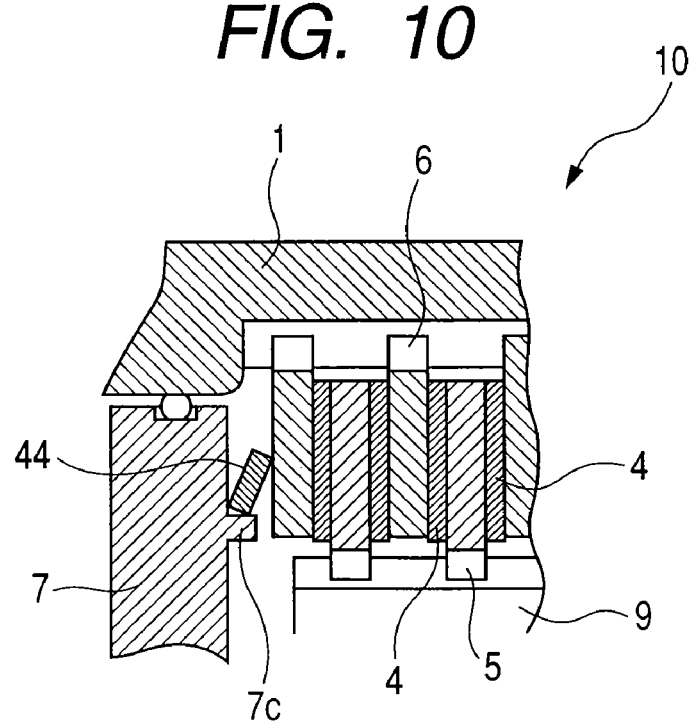
FIG. 10 is an axial partial sectional view of a wet-type multi-plate friction engaging apparatus, showing an example of a load acting portion provided on a piston.

FIG. 10 is an axial partial sectional view of a wet-type multi-plate friction engaging apparatus, showing an example of a load acting portion provided in connection with the piston. An annular protrusion 7*c* is provided on a surface (opposed to the externally toothed plate 6) of the piston 7, and a dish-shaped spring 44 is mounted around the protrusion 7*c*. The dish-shaped spring 44 acts as a load acting portion which abuts against the externally toothed plate 6. In place of the dish-shaped spring 44, another biasing member such as a coil spring and the like may be used.

Figure 13:
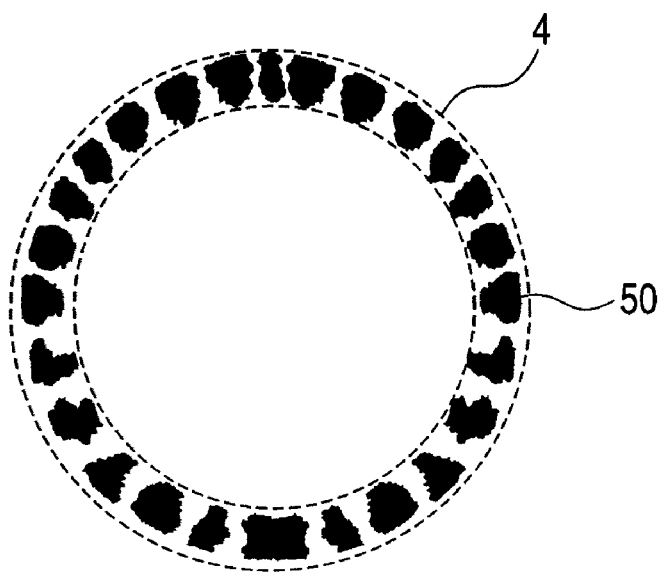
FIG. 13 is a schematic view showing face pressure distribution on a friction material secured to a plate near a clutch opening portion, according to the embodiment of the present invention.

FIG. 13 is a schematic view showing face pressure distribution on a friction material secured to a plate near a clutch opening portion, according to the embodiment of the present invention. Further, FIG. 14 is a schematic view showing face pressure distribution on a friction material secured to a plate near a clutch opening portion, according to a prior art.

As shown in FIG. 13, according to the embodiment of the present invention, as apparent from pressure marks 50 shown, uniform face pressure distribution can be obtained from an outer diameter side to an inner diameter side, with the result that face pressures of the plates within the clutch portion can be made uniform and dispersion in face pressure distribution between the clutch plates can be minimized, thereby providing a heat-resistive wet-type multi-plate friction engaging apparatus having stable speed change performance.

Figure 14:
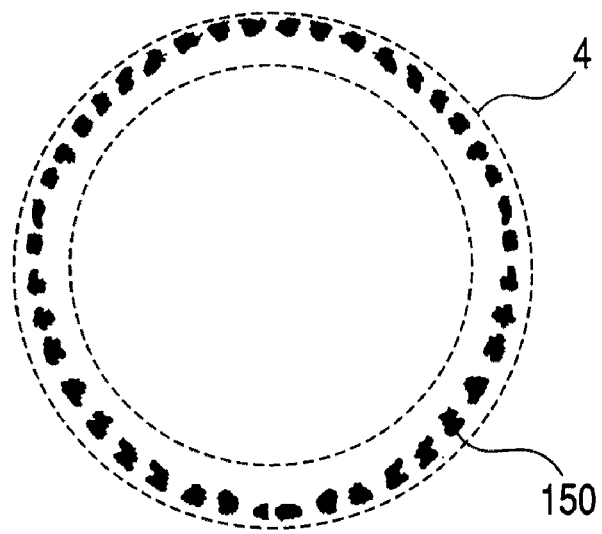
FIG. 14 is a schematic view showing face pressure distribution on a friction material secured to a plate near a clutch opening portion, according to a prior art.

To the contrary, from FIG. 14 showing the prior art, it can be seen that pressure marks 50 are offset toward an outer diameter side not to provide uniform face pressure distribution. That is to say, it can be seen that the face pressure on the friction material within the clutch opening at the outer diameter side is greater than that in the inner diameter side. Accordingly, since the whole surface of the friction material does not work effectively, the heat-resistance may be deteriorated and smooth movements of the respective plates may be prevented during the engagement and a bad influence may be affected upon the engaging ability.

In the embodiments of the present invention as mentioned above, the protrusions may be provided as annular members on the piston or the plate member. The annular member may be continuous or discontinuous.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-054120, filed Mar. 5, 2007, which is hereby incorporated by reference in its entirety.

What is claimed is:

1. A wet-type multi-plate friction engaging apparatus comprising:
   a clutch portion including internally toothed plates each having at least one axial surface on which a friction material is provided and externally toothed plates arranged alternately with said internally toothed plates in an axial direction; and a piston adapted to apply an urging force for engaging said internally toothed plates and said externally toothed plates with each other;

and wherein load acting portions acting on said clutch portion are arranged on both sides of said clutch portion, and a contact area of each load acting portion through which said load acting portion is contacted with said clutch portion is located in a predetermined range between about 20% of a radial width of a friction engaging portion from a central position of said friction engaging portion in an outer diameter direction and about 20% of the radial width of said friction engaging portion from the central position in an inner diameter direction, and a radial width of said contact area is smaller than about 10% of the radial width of said friction engaging portion.

2. A wet-type multi-plate friction engaging apparatus according to claim 1, wherein said load acting portion is a protrusion.

3. A wet-type multi-plate friction engaging apparatus according to claim 2, wherein said protrusion is formed as a curved surface.

4. A wet-type multi-plate friction engaging apparatus according to claim 2, wherein said protrusion has an entirely curved surface.

5. A wet-type multi-plate friction engaging apparatus according to claim 2, wherein said protrusion has a trapezoidal shape or a triangular shape.

6. A wet-type multi-plate friction engaging apparatus according to claim 2, wherein said protrusion includes a surface inclined from an outer diameter to an inner diameter or a surface inclined from the inner diameter to the outer diameter.

7. A wet-type multi-plate friction engaging apparatus according to claim 1, wherein a plate member arranged in a position opposed to said piston with the interposition of said clutch portion has a surface inclined from an outer diameter to an inner diameter and also has a cushioning function.

8. A wet-type multi-plate friction engaging apparatus according to claim 2, wherein said protrusion is formed as a separate part mounted to said plate member or said piston.

9. A wet-type multi-plate friction engaging apparatus according to claim 8, wherein said protrusion has a cushioning function.

10. A wet-type multi-plate friction engaging apparatus according to claim 1, wherein a plate member arranged in a position opposed to said piston with the interposition of said clutch portion has a stop ring function.

11. A wet-type multi-plate friction engaging apparatus according to claim 10, wherein said plate member has a radially extending cut.

12. A wet-type multi-plate friction engaging apparatus according to claim 1, wherein said piston is provided with a loading plate for urging said externally toothed plate.

13. A wet-type multi-plate friction engaging apparatus according to claim 12, wherein said loading plate has a cushioning function.

14. A wet-type multi-plate friction engaging apparatus according to claim 1, wherein one of said load acting portions is formed as a protruded portion of a clutch drum.

15. A wet-type multi-plate friction engaging apparatus according to claim 2, wherein one of said load acting portions is provided on a surface of said piston which is opposed to one of said externally toothed plates.

* * * * *